US010170126B2

(12) United States Patent
Kovesi et al.

(10) Patent No.: US 10,170,126 B2
(45) Date of Patent: Jan. 1, 2019

(54) EFFECTIVE ATTENUATION OF PRE-ECHOES IN A DIGITAL AUDIO SIGNAL

(71) Applicant: Orange, Paris (FR)

(72) Inventors: Balazs Kovesi, Lannion (FR); Stephane Ragot, Lannion (FR)

(73) Assignee: ORANGE, Paris (FR)

(*) Notice: Subject to any disclaimer, the term of this patent is extended or adjusted under 35 U.S.C. 154(b) by 236 days.

(21) Appl. No.: 14/654,791

(22) PCT Filed: Dec. 20, 2013

(86) PCT No.: PCT/FR2013/053216
§ 371 (c)(1),
(2) Date: Jun. 22, 2015

(87) PCT Pub. No.: WO2014/096733
PCT Pub. Date: Jun. 26, 2014

(65) Prior Publication Data
US 2015/0348561 A1 Dec. 3, 2015

(30) Foreign Application Priority Data
Dec. 21, 2012 (FR) ...................... 12 62598

(51) Int. Cl.
H04B 3/21 (2006.01)
G10L 21/02 (2013.01)
G10L 19/012 (2013.01)

(52) U.S. Cl.
CPC .............. G10L 19/012 (2013.01); H04B 3/21 (2013.01); G10L 21/02 (2013.01)

(58) Field of Classification Search
None
See application file for complete search history.

(56) References Cited

U.S. PATENT DOCUMENTS 8,756,054 B2 6/2014 Kovesi et al.
2007/0067166 A1* 3/2007 Pan ...................... G10L 19/038
704/222
(Continued)

FOREIGN PATENT DOCUMENTS

FR 2888704 A1 1/2007
FR 2897733 A1 8/2007
(Continued)

OTHER PUBLICATIONS

International Search Report dated Mar. 31, 2014 for corresponding International Application No. PCT/FR2013/053216, filed Dec. 20, 2013.
(Continued)

Primary Examiner — Richa Mishra
(74) Attorney, Agent, or Firm — David D. Brush; Westman, Champlin & Koehler, P.A.

(57) ABSTRACT

A method is provided for processing attenuation of pre-echo in a digital audio signal decoded by transform decoding. The method includes the following acts: decomposition of the decoded signal into at least two sub-signals according to a pre-determined decomposition criterion; calculation of attenuation factors per sub-signal and per sample of a previously determined pre-echo zone; attenuation of pre-echo in the pre-echo zone of each of the sub-signals by applying attenuation factors to the sub-signals; and production of the attenuated signal by addition of the attenuated sub-signals. Also provided are a processing device implementing the acts of the described method, and a decoder including such a device.

9 Claims, 14 Drawing Sheets

(56) References Cited

U.S. PATENT DOCUMENTS

2009/0313009 A1* 12/2009 Kovesi ................ G10L 19/24
704/203
2011/0178617 A1* 7/2011 Kovesi ................ G10L 19/26
700/94

FOREIGN PATENT DOCUMENTS

| GB | 2379369 A | 3/2003 |
|----|-----------|--------|
| WO | 2007006958 A2 | 1/2007 |
| WO | 2010031951 A1 | 3/2010 |

OTHER PUBLICATIONS

English translation of the Written Opinion of the International Searching Authority dated Jun. 21, 2015 for corresponding International Application No. PCT/FR2013/053216, filed Dec. 20, 2013.
French Search Report and Written Opinion dated Sep. 6, 2013 for corresponding French Application No. 1262598, filed Dec. 21, 2012.
"G.729 Based Embedded Variable Bit-Rate Conder: An 8-32 kbit/s/scalable wideband coder bitstream interoperable with G.729; G729.1 (May 6)", ITU-T Draft Study Period 2005-2008, International Telecommunication Union, Geneva; CH, No. G.729.1 (May 6), May 29, 2006 (May 29, 2006), XP017404590.
Mahieux et al., "High Quality Audio Transform Coding at 64 kbits", IEEE Trans. on Communications vol. 42, No. 11, Nov. 1994.
Kövesi et al. "Pre-echo reduction in the ITU-T G.729.1 embedded coder," EUSIPCO, Lausanne, Switzerland, Aug. 2008.

\* cited by examiner

EFFECTIVE ATTENUATION OF PRE-ECHOES IN A DIGITAL AUDIO SIGNAL

CROSS-REFERENCE TO RELATED APPLICATIONS

This application is a Section 371 National Stage Application of International Application No. PCT/FR2013/053216, filed Dec. 20, 2013, the content of which is incorporated herein by reference in its entirety, and published as WO 2014/096733 on Jun. 26, 2014, not in English.

FIELD OF THE DISCLOSURE

The invention relates to a method and a device for processing attenuation of the pre-echoes when decoding a digital audio signal.

For the transmission of the digital audio signals over telecommunication networks, whether they are for example fixed or mobile networks, or for the storage of the signals, compression (or source coding) processes are involved implementing coding systems which are generally of the temporal coding by linear prediction type or frequency coding by transform type.

The method and the device, the subjects of the invention, thus lie within the scope of the compression of sound signals, in particular the digital audio signals coded by frequency transform.

BACKGROUND OF THE DISCLOSURE

FIG. 1 represents, by way of illustration, a schematic diagram of the coding and of the decoding of a digital audio signal by transform including an analysis-synthesis by overlap-addition according to the prior art.

Certain musical sequences, such as percussions and certain speech segments like the plosive consonants (/k/, /t/, etc.) are characterized by extremely abrupt onsets which are reflected in very rapid transitions and a very strong variation of the dynamic range of the signal in the space of a few samples. An exemplary transition is given in FIG. 1 from the sample 410.

For the coding/decoding processing, the input signal is subdivided into blocks of samples of length L, the boundaries of which are represented in FIG. 1 by vertical dotted lines. The input signal is denoted x(n), where n is the index of the sample. The breakdown into successive blocks (or frames) results in the definition of the blocks $X_N(n)=$ [x(N·L) ... x(N·L+L−1)]=[$x_N(0)$ ... $x_N(L−1)$], where N is the index of the block (or of the frame), L is the length of the frame. In FIG. 1, L=160 samples. In the case of the modified discrete cosine transform MDCT, two blocks $X_N(n)$ and $X_{N+1}(n)$ are analyzed jointly to give a block of transformed coefficients associated with the frame of index N and the analysis window is sinusoidal.

The division into blocks, also called frames, applied by the transform coding is totally independent of the sound signal and the transitions can therefore appear at any point of the analysis window. Now, after transform decoding, the reconstructed signal is affected by "noise" (or distortion) caused by the quantization (Q)-inverse quantization ($Q^{-1}$) operation. This coding noise is distributed in time in a relatively uniform manner over the entire time medium of the transformed block, that is to say over the entire length of the window of length 2L of samples (with overlap of L samples). The energy of the coding noise is generally proportional to the energy of the block and is a function of the coding/decoding bit rate.

For a block comprising an onset (like the block 320-480 of FIG. 1) the energy of the signal is high, the noise is therefore also of high level.

In transform coding, the level of the coding noise is typically lower than that of the signal for the segments of high energy which immediately follow the transition, but the level is higher than that of the signal for the segments of lower energy, notably over the part preceding the transition (samples 160-410 of FIG. 1). For the abovementioned part, the signal-to-noise ratio is negative and the resulting degradation can appear very annoying when listening. Pre-echo is the name given to the coding noise prior to the transition and post-echo is the name given to the noise following the transition.

It can be seen in FIG. 1 that the pre-echo affects the frame preceding the transition as well as the frame where the transition occurs.

Psycho-acoustic experiments have shown that the human ear performs a temporal pre-masking of the sounds that is fairly limited, of the order of a few milliseconds. The noise preceding the onset, or pre-echo, is audible when the duration of the pre-echo is greater than the pre-masking duration.

The human ear also performs a post-masking of a longer duration, from 5 to 60 milliseconds, in the transition from sequences of high energy to sequences of low energy. The rate or level of discomfort that is acceptable for the post-echoes is therefore higher than for the pre-echoes.

The phenomenon of the pre-echoes, more critical, is all the more annoying when the length of the blocks in terms of number of samples is significant. Now, in transform coding, it is well known that for the stationary signals, the more the length of the transform increases, the greater the coding gain becomes. With fixed sampling frequency and with fixed bit rate, if the number of points of the window (therefore the length of the transform) is increased, there will be more bits per frame to code the frequency rays deemed useful by the psycho-acoustic model, hence the benefit of using blocks of great length. The MPEG AAC (Advanced Audio Coding) coding, for example, uses a window of great length which contains a fixed number of samples, 2048, i.e. over a duration of 64 ms if the sampling frequency is 32 kHz; the problem of the pre-echoes is managed there by making it possible to switch from these long windows to 8 short windows through the intermediate windows (called transition windows), which requires a certain delay in the coding to detect the presence of a transition and adapt the windows. The length of these short windows is therefore 256 samples (8 ms at 32 kHz). At low bit rate, it is still possible to have an audible pre-echo of a few ms. The switching of the windows makes it possible to attenuate the pre-echo but not eliminate it. The transform coders used for the conversational applications, like ITU-T G.722.1, G.722.1C or G.719, often use a frame length of 20 ms and a window of 40 ms duration at 16, 32 or 48 kHz (respectively). It can be noted that the ITU-T G.719 coder incorporates a window switching mechanism with transient detection, but the pre-echo is not completely reduced at low bit rate (typically at 32 kbit/s).

In order to reduce the abovementioned annoying effect of the pre-echo phenomenon, different solutions have been proposed at the coder and/or decoder level.

The switching of windows has already been cited; it entails transmitting auxiliary information to identify the type of windows used in the current frame. Another solution consists in applying an adaptive filtering. In the zone preceding the onset, the reconstructed signal is seen as the sum of the original signal and of the quantization noise.

A corresponding filtering technique has been described in the article entitled High Quality Audio Transform Coding at 64 kbits, IEEE Trans. on Communications Vol 42, No. 11, November 1994, published by Y. Mahieux and J. P. Petit.

The implementation of such filtering entails the knowledge of parameters, some of which, like the prediction coefficients and the variance of the signal corrupted by the pre-echo, are estimated on the decoder from noisy samples. By contrast, the information such as the energy of the original signal can be known only to the coder and must consequently be transmitted. This entails transmitting additional information, which, with constrained bit rate, reduces the relative budget allocated to the transform coding. When the received block contains an abrupt variation of dynamic range, the filtering processing is applied to it.

The abovementioned filtering process does not make it possible to retrieve the original signal, but provides a strong reduction of the pre-echoes. It does however entail transmitting the additional parameters to the decoder.

Unlike the preceding solutions, different pre-echo reduction techniques without specific transmission of the information have been proposed. For example, a review of the reduction of pre-echoes in the context of hierarchical coding is presented in the article by B. Kovesi, S. Ragot, M. Gartner, H. Taddei, "Pre-echo reduction in the ITU-T G.729.1 embedded coder," EUSIPCO, Lausanne, Switzerland, August 2008.

A typical example of pre-echo attenuation method without auxiliary information is described in the French patent application FR 08 56248. In this example, attenuation factors are determined per sub-block, in the sub-blocks of low energy preceding a sub-block in which a transition or onset has been detected.

The attenuation factor g(k) in the kth sub-block is computed for example as a function of the ratio R(k) between the energy of the sub-block of strongest energy and the energy of the kth sub-block concerned:

$$g(k)=f(R(k))$$

where $f$ is a decreasing function with values between 0 and 1 and k is the number of the sub-block. Other definitions of the factor g(k) are possible, for example as a function of the energy En(k) in the current sub-block and of the energy En(k−1) in the preceding sub-block.

If the energy of the sub-blocks varies little relative to the maximum energy in the sub-blocks considered in the current frame, no attenuation is then necessary; the factor g(k) is set at an attenuation factor inhibiting the attenuation, that is to say 1. Otherwise, the attenuation factor lies between 0 and 1.

In most cases, above all when the pre-echo is annoying, the frame which precedes the pre-echo frame has a uniform energy which corresponds to the energy of a segment of low energy (typically a background noise). From experience, it is neither useful nor even desirable for, after pre-echo attenuation processing, the energy of the signal to become lower than the average energy (per sub-block) of the signal preceding the processing zone—typically that of the preceding frame, denoted $\overline{En}$, or that of the second half of the preceding frame, denoted $\overline{En'}$.

For the sub-block of index k to be processed, it is possible to compute the limit value, denoted $\lim_g(k)$, of the attenuation factor in order to obtain exactly the same energy as the average energy per sub-block of the segment preceding the sub-block to be processed. This value is of course limited to a maximum of 1 since it is the attenuation values that are of interest here. More specifically, the following is defined here:

$$\lim_g(k) = \min\left(\sqrt{\frac{\max(\overline{En}, \overline{En'})}{En(k)}}, 1\right)$$

in which the average energy of the preceding segment is approximated by the value $\max(\overline{En},\overline{En'})$.

The value $\lim_e(k)$ that is thus obtained serves as lower limit in the final computation of the attenuation factor of the sub-block, and is therefore used as follows:

$$g(k)=\max(g(k),\lim_g(k))$$

The attenuation factors (or gains) g(k) determined per sub-blocks can then be smoothed by a smoothing function applied sample by sample to avoid abrupt variations of the attenuation factor at the boundaries of the blocks.

For example, it is possible to first define the gain per sample as a piecewise constant function:

$$g_{pre}(n)=g(k), n=kL', \ldots, (k+1)L'-1$$

in which L' represents the length of a sub-block.

The function is then smoothed according to the following equation:

$$g_{pre}(n):=\alpha g_{pre}(n-1)+(1-\alpha)g_{pre}(n), n=0, \ldots, L-1$$

with the convention that $g_{pre}(-1)$ is the last attenuation factor obtained for the last sample of the preceding sub-block, α is the smoothing coefficient, typically α=0.85.

Other smoothing functions are also possible such as, for example, linear cross-fading over u samples:

$$g_{pre}(n) = \frac{1}{u}\sum_{i=0}^{u-1} g'_{pre}(n-i), n = 0, \ldots, L-1$$

in which $g_{pre}'(n)$ is the non-smoothed attenuation and $g_{pre}(n)$ is the smoothed attenuation, $g_{pre}'(n)$ with $n=-(u-1), \ldots, -1$ are the last u−1 attenuation factors obtained for the last samples of the preceding sub-block. It is for example possible to take u=5.

Once the $g_{pre}(n)$ factors are thus computed, the attenuation of pre-echoes is done on the signal reconstructed in the current frame, $x_{rec}(n)$, by multiplying each sample by the corresponding factor:

$$x_{rec,g}(n)=g_{pre}(n)x_{rec}(n), n=0, \ldots, L-1$$

where $x_{rec,g}(n)$ is the signal decoded and post processed by pre-echo reduction.

FIGS. 2 and 3 illustrate the implementation of the attenuation method as described in the abovementioned, and previously summarized, prior art patent application.

In these examples, the signal is sampled at 32 kHz, the length of the frame is L=640 samples and each frame is divided into 8 sub-blocks of K=80 samples.

In the part a) of FIG. 2, a frame of an original signal sampled at 32 kHz is represented. An onset (or transition) in the signal is located in the sub-block beginning at the index 320. This signal has been coded by a transform coder of MDCT type at low bit rate (24 kbit/s).

In the part b) of FIG. 2, the result of the decoding without pre-echo processing is illustrated. The pre-echo can be observed from the sample 160, in the sub-blocks preceding the one containing the onset.

The part c) shows the trend of the pre-echo attenuation factor (continuous line) obtained by the method described in the abovementioned prior art patent application. The dotted line represents the factor before smoothing. It should be noted here that the position of the onset is estimated around the sample 380 (in the block delimited by the samples 320 and 400).

The part d) illustrates the result of the decoding after application of the pre-echo processing (multiplication of the signal b) with the signal c)). It can be seen that the pre-echo has indeed been attenuated. FIG. 2 also shows that the smoothed factor does not go back to 1 at the time of the onset, which implies a decrease in the amplitude of the onset. The perceptible impact of this decrease is very small but can nevertheless be avoided. FIG. 3 illustrates the same example as FIG. 2, in which, before smoothing, the attenuation factor value is forced to 1 for the few samples of the sub-block preceding the sub-block where the onset is located. The part c) of FIG. 3 gives an example of such a correction.

In this example, the factor value 1 has been assigned to the last 16 samples of the sub-block preceding the onset, from the index 364. Thus, the smoothing function progressively increases the factor to have a value close to 1 at the time of the onset. The amplitude of the onset is then preserved, as illustrated in the part d) of FIG. 3, but a few pre-echo samples are not attenuated.

In the example of FIG. 3, the pre-echo reduction by attenuation does not make it possible to reduce the pre-echo to the level of the onset, because of the smoothing of the gain.

Another example with the same setting as that of FIG. 3 is illustrated in FIG. 4. This figure represents 2 frames to better show the nature of the signal before the onset. Here, the energy of the original signal before the onset is stronger (part a)) than in the case illustrated by FIG. 3, and the signal before the onset is audible (samples 0-850). In the part b) the pre-echo on the signal decoded without pre-echo processing can be observed in the 700-850 zone. According to the attenuation limiting procedure explained previously, the energy of the signal of the pre-echo zone is attenuated to the average energy of the signal preceding the processing zone. In the part c), it can be seen that the attenuation factor computed by taking account of the energy limitation is close to 1 and that the pre-echo is still present on the part d) after application of the pre-echo processing (multiplication of the signal b) with the signal c)), despite the correct leveling of the signal in the pre-echo zone. This pre-echo can in fact be clearly distinguished on the wave form where it can be seen that a high-frequency component is superposed on the signal in this zone.

This high-frequency component is clearly audible and annoying, and the onset is less clear (part d) FIG. 4).

The explanation of this phenomenon is as follows: in the case of a very abrupt, impulsive onset (as illustrated in FIG. 4), the spectrum of the signal (in the frame containing the onset) is more white and therefore also contains a lot of high frequencies. Thus, the quantization noise is also spread and relatively flat in frequencies (white) and made up of high frequencies, which is not the case of the signal preceding the pre-echo zone. There is therefore an abrupt change in the spectrum from one frame to the other, which results in an audible pre-echo despite the fact that the energy has been set to the correct level.

This phenomenon is again represented in FIGS. 5a and 5b which respectively show the spectrograms of the original signal in 5a, corresponding to the signal represented in part a) of FIG. 4, and the spectrogram of the signal with pre-echo attenuation according to the prior art, in 5b, corresponding to the signal represented in part d) of FIG. 4.

A still audible pre-echo can clearly be seen in the framed part in FIG. 5b.

There is therefore a need for an improved technique for attenuating pre-echoes in decoding, which makes it possible to attenuate the undesirable high frequencies and, more generally, the spurious pre-echoes precisely and universally and without any auxiliary information being transmitted by the coder.

SUMMARY

An exemplary embodiment of the present invention deals with a method for processing attenuation of pre-echo in a digital audio signal decoded according to a transform decoding. The method is such that it comprises the following steps:
- decomposition of the decoded signal into at least two sub-signals according to a predetermined decomposition criterion;
- computation of attenuation factors per sub-signal and per sample of a previously determined pre-echo zone;
- attenuation of pre-echo in the pre-echo zone of each of the sub-signals by application of the attenuation factors to the sub-signals; and
- obtaining of the attenuated signal by combination of the attenuated sub-signals.

Thus, the method makes it possible to accurately control the attenuation to be applied to each of the sub-signals. These sub-signals have components representative of particular characteristics of the decoded signal, according to the chosen decomposition criterion. Thus, the quantity of attenuation to be applied for these different characteristics can be adapted. The pre-echo attenuation in this decoded signal is then more accurate and more effective.

The different particular embodiments mentioned hereinbelow can be added independently or in combination with one another, in the steps of the method defined above.

In a first embodiment, the predetermined decomposition criterion is a frequency criterion.

Thus, the attenuation is adapted accurately to the frequency characteristics of the decoded signal.

In a particular embodiment, the decomposition of the decoded signal is performed by a first low-pass or high-pass filtering to obtain a first sub-signal.

A first sub-signal therefore comprises low-frequency components in the case of a low-pass filtering or high-frequency components in the case of a high-pass filtering. The attenuation for this first sub-signal is adapted to its frequency components.

According to a possible embodiment, the decomposition of the signal is performed further by a second high-pass or low-pass filtering, complementing the first filtering, to obtain a second sub-signal.

A second sub-signal therefore comprises high-frequency components in the case of a complementary high-pass filtering or low-frequency components in the case of a complementary low-pass filtering. The attenuation for this second sub-signal is also adapted to its frequency components.

According to another possible embodiment, a second sub-signal is obtained by subtraction of the first sub-signal from the decoded signal, so as to avoid a second filtering to obtain the second sub-signal. This therefore reduces the complexity of the decomposition step of the method.

In particular, the filtering is finite impulse response filtering with zero transfer function phase:

$$c(n)z^{-1}+(1-2c(n))+c(n)z$$

with $c(n)$ being a coefficient lying between 0 and 0.25.

This type of filtering is of low complexity.

In a variant embodiment, the decomposition of the decoded signal is performed by QMF and PQMF filtering to obtain sub-signals in sub-bands.

A number of sub-signals are thus obtained, each of the sub-signals being represented in a different frequency band. The resulting attenuation thus makes it possible to take account of the spectral distribution of the pre-echo. The attenuation is then adapted to these spectral characteristics.

In a second embodiment, the predetermined decomposition criterion is a criterion of periodicity of the signal.

In this embodiment, the attenuation is adapted to the periodicity characteristics of the signal. A first sub-signal comprising, for example, periodic components of sinusoidal type and a second sub-signal comprising noise components.

According to a possible embodiment, the pre-echo zone is determined according to the following steps:
  detection of an onset position in the decoded signal, before the decomposition step;
  determination of a pre-echo zone preceding the onset position detected in the decoded signal before the decomposition step or in the sub-signals after the decomposition step.

Thus, the step of detection of the onset position is pooled for all the sub-signals, thus making it possible to reduce the processing complexity. The step of determination of a pre-echo zone can also be pooled in the interests of low complexity or can be done in the sub-signals for a good low-complexity/adaptation to the signal trade-off.

According to another possible embodiment, the pre-echo zone is determined according to the following steps:
  detection of an onset position in each of the sub-signals obtained after the decomposition step;
  determination of a pre-echo zone preceding the onset position detected in each of the sub-signals.

The detection of the onset position can be performed differently according to the sub-signal to which it is applied. This makes it possible to best adapt the detection as a function of the sub-signal, to the detriment of greater processing complexity.

So as to further simplify the method according to one embodiment of the invention, for at least one sub-signal, the computation of the attenuation factor is performed by using at least one parameter of the step of detection of an onset position in the decoded signal.

This can in fact be the case for the sub-signal comprising low-frequency components which generally have much more energy than the high-frequency components, the energies per sub-block of the decoded signal $x_{rec}(n)$ and of the sub-signal mostly comprising low-frequency components $x_{rec,ss1}(n)$ then being very close. It is therefore no longer necessary to recompute the energies of the sub-blocks in order to compute the sub-signal attenuation factor because, for this signal, the energy values per sub-block are already computed to detect the onsets.

In a particular embodiment, a step of smoothing of the attenuation factor is applied for at least one sub-signal.

This smoothing makes it possible to avoid the abrupt variations of the attenuation factor at the boundaries of the sample blocks.

In an advantageous embodiment, the attenuation factor is forced to 1 for a predetermined number of samples preceding the start of the onset.

Thus, the attenuation factor has a value of 1 at the time of the onset, which makes it possible to preserve the amplitude of the onset.

The invention relates also to a device for processing attenuation of pre-echo in a digital audio signal decoded from a transform decoder. This device is such that it comprises:
  a module for decomposing the decoded signal into at least two sub-signals according to a predetermined decomposition criterion;
  a module for computing attenuation factors per sub-signal and per sample of a previously determined pre-echo zone;
  a module for attenuating pre-echo in the pre-echo zone of each of the sub-signals by application of the attenuation factors to the sub-signals;
  a module for obtaining the attenuated signal by combination of the attenuated sub-signals.

The advantages of this device are the same as those described for the attenuation processing method that it implements.

The invention targets a decoder of a digital audio signal comprising a device as described previously.

The invention also targets a computer program comprising code instructions for implementing the steps of the method as described previously, when these instructions are executed by a processor.

Finally, the invention relates to a storage medium, that can be read by a processor, incorporated or not in the processing device, possibly removable, storing a computer program implementing a processing method as described previously.

BRIEF DESCRIPTION OF THE DRAWINGS

Other features and advantages of the invention will become more clearly apparent on reading the following description, given purely as a nonlimiting example, and with reference to the attached drawings, in which.

DETAILED DESCRIPTION OF ILLUSTRATIVE EMBODIMENTS

Figure 6:
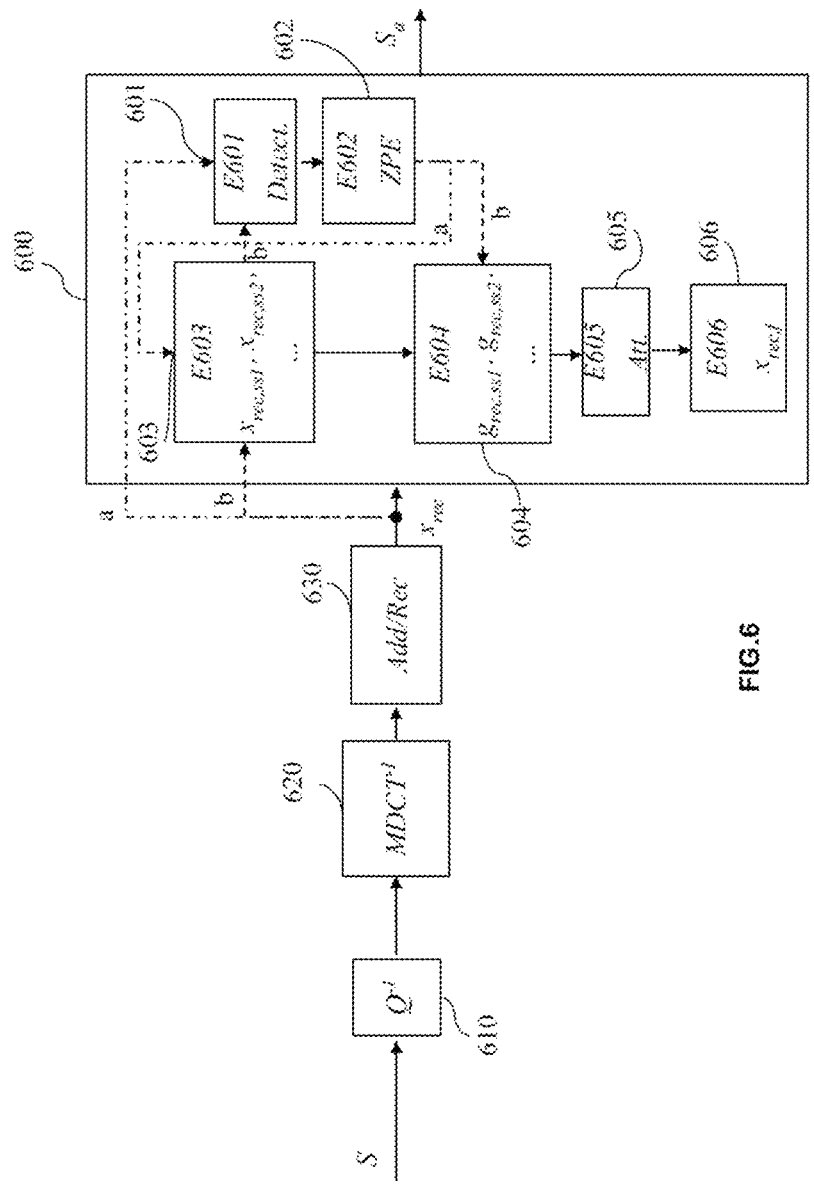
FIG. 6 illustrates a device for processing pre-echo attenuation in a digital audio signal decoder, and the steps implemented by the processing method according to an embodiment of the invention.

Referring to FIG. 6, a pre-echo attenuation processing device 600 is described. This attenuation processing device 600 as described hereinbelow is included in a decoder comprising an inverse quantization ($Q^{-1}$) module 610 receiving a signal S, an inverse transform ($MDCT^{-1}$) module 620, a module 630 for reconstructing the signal by overlap-addition (Add/rec) as described with reference to FIG. 1 and delivering a reconstructed signal $x_{rec}(n)$ to the attenuation processing device according to the invention. It can be noted that, here, the example of the MDCT transform is taken, which is the most commonplace in speech and audio coding, but the device 600 applies also to any other type of transform (FFT, DCT, etc.).

At the output of the device 600, a processed signal Sa is supplied in which a pre-echo attenuation has been performed.

The device 600 implements a method for attenuating pre-echoes in the decoded signal $x_{rec}(n)$ which is decomposed into sub-signals—this decomposition is specific to the pre-echo processing.

In one embodiment of the invention, the attenuation processing method comprises a step of detection (E601) of the onsets which can generate a pre-echo, in the decoded signal $x_{rec}(n)$. It can be noted that the attenuation device 600 can be applied equally in the cases where the synthesis MDCT windowing is fixed and in those where the windowing is adaptive.

Thus, the device 600 comprises a detection module 601 suitable for implementing a step of detection (E601) of the position of an onset in a decoded audio signal.

An onset is a rapid transition and an abrupt variation of the dynamic range (or amplitude) of the signal. This type of signal can be designated by the more general term of "transient". Hereinbelow, and with no loss of generality, only the terms onset or transition will be used to also describe transients.

In this embodiment, illustrated by the chain dotted line arrows "a", the pre-echo detection is performed on the decoded signal before the step of decomposition (E603) into sub-signals of the module 603 described later.

Each current frame of L samples of the decoded signal $x_{rec}(n)$ is divided into K sub-blocks of length L', with, for example, L=640 samples (20 ms) at 32 kHz, L'=80 samples (2.5 ms) and K=8. Preferably, the size of these sub-blocks is therefore identical, but the invention remains valid and can easily be generalized when the sub-blocks have a variable size. This may be the case for example when the length of the frame L is not divisible by the number of sub-blocks K or if the frame length is variable.

Special low delay analysis-synthesis windows similar to those described in the ITU-T G.718 standard are used for the analysis part and for the synthesis part of the MDCT transformation. An example of such windows is illustrated with reference to FIG. 8. The delay caused by the transformation is only 192 samples by contrast with the delay of 640 samples in the case of use of conventional sinusoidal windows. Thus, the MDCT memory with special low delay analysis-synthesis windows contains only 96 independent samples (not folded with the current frame) contrary to the 320 samples in the case of use of the conventional sinusoidal windows.

Figure 8:
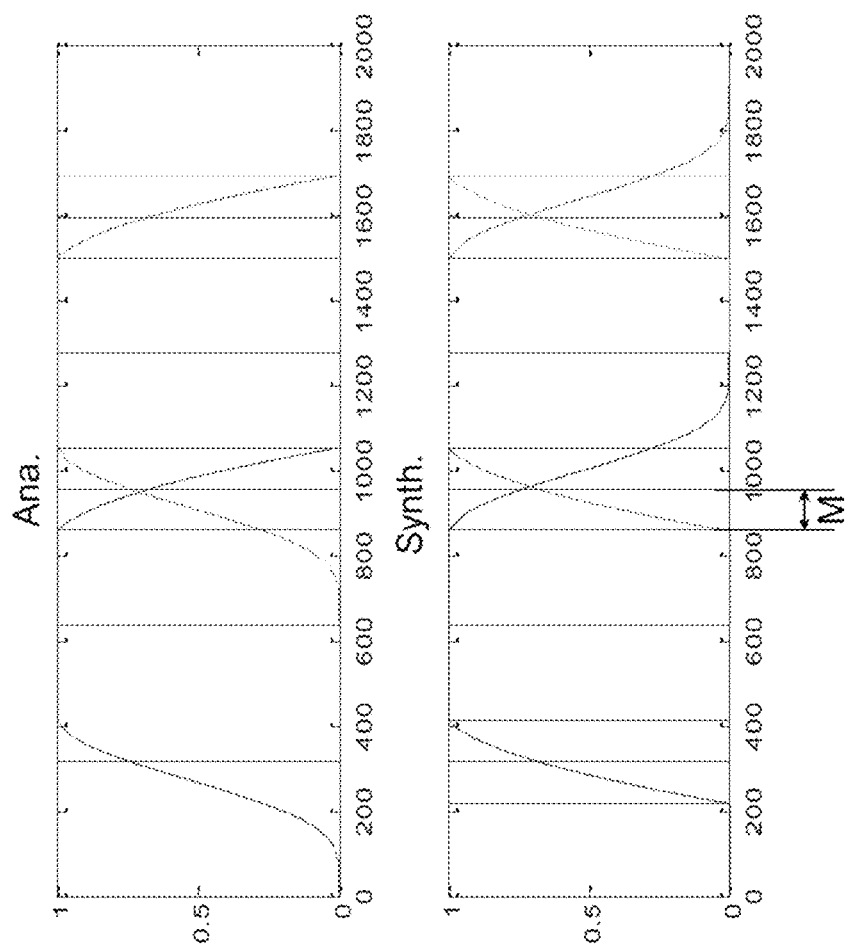
FIG. 8 illustrates an example of analysis windows and of synthesis windows with low delay for the transform coding and decoding likely to create the pre-echo phenomenon.

It can in fact be seen in FIG. 8, for the analysis windows (Ana.), that the folding zone is limited by dotted lines between the samples 864 and 1055. The folding line is represented by a chain dotted line at sample 960.

For the synthesis (Synth.), only the samples represented by the range M (96 samples) are necessary to obtain the information concerning the analysis folding zone, by exploiting the symmetry. These samples contained in memory are therefore useful for decoding this folding zone by using also the folded samples of the window of the next frame. In the case of an onset in this zone between the samples 864 and 1055, the average energy of the samples represented by the range M is significantly greater than the energy of subframes preceding the sample 864. The abrupt increase in the energy of the range M contained in the MDCT memory can therefore signal an onset in the next frame which can generate a pre-echo in the current frame.

In a variant of this embodiment, other analysis/synthesis windows can be used, or switchovers between long and short windows can be used.

The MDCT memory $x_{MDCT}(n)$ is used, which gives a version with temporal folding of the future signal. This memory or a part of this memory (because of redundancies) is also divided into K' sub-blocks of length $L_m(n)$, n=0, ..., K' where $L_m(n)$ is comparable but not necessarily identical to L'. In the case of use of conventional sinusoidal windows, only the K'=4 first sub-blocks of length $L_m(n)$=L'=80 of the signal $x_{MDCT}(n)$ are retained, because the last 4 sub-blocks are symmetrical relative to the first 4 sub-blocks and thus do not convey any additional information for the detection of an onset in the next frame. On the contrary, if special analysis-synthesis windows with low delay as illustrated in FIG. 8 are used, only one (K'=1) block of length $L_m(0)$=96 is retained, which contains all the samples independent of the MDCT memory. Despite the greater number of samples in this sub-block, its energy remains comparable with that of the sub-blocks of the current frame because the memory part has been windowed (therefore attenuated) by the analysis window. It can be noted that the number of samples is 96 (instead of 80) and that the windowing could be compensated; the invention applies equally in the case where such a compensation is implemented.

Figure 1:
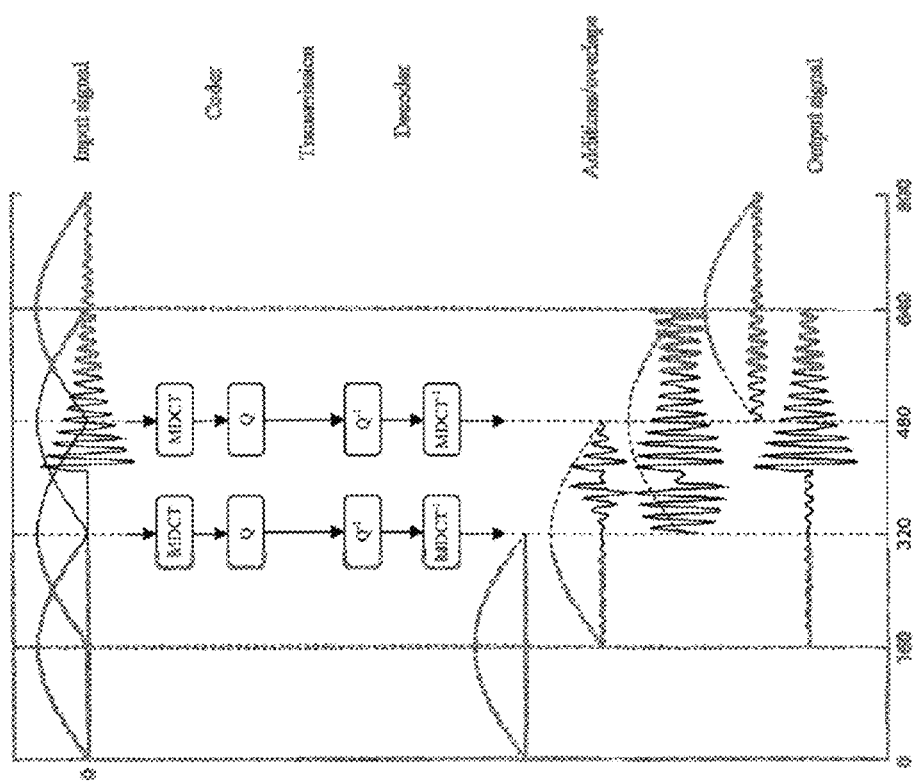
FIG. 1, previously described, illustrates a transform coding-decoding system according to the prior art.
Figure 2:
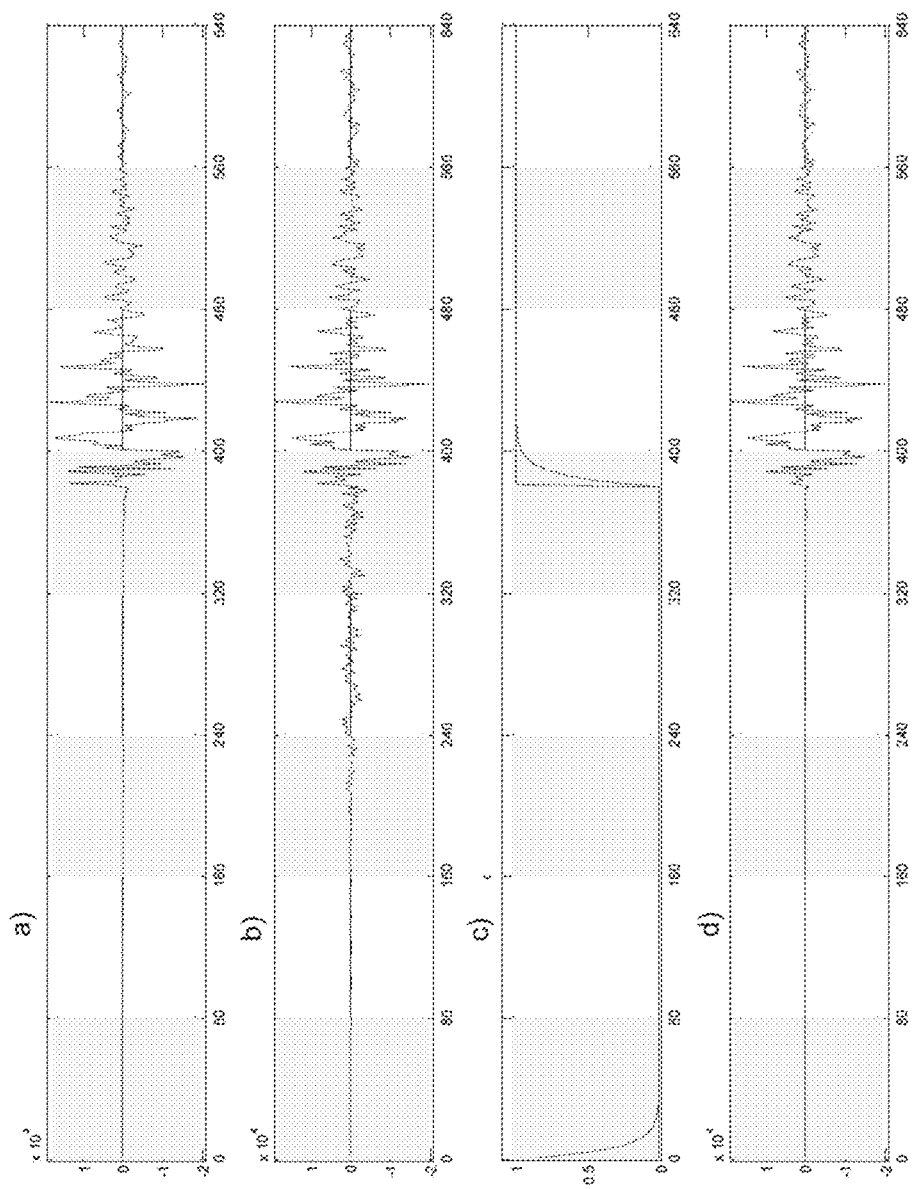
FIG. 2, previously described, illustrates an exemplary digital audio signal for which an attenuation method according to the prior art is performed.
Figure 3:
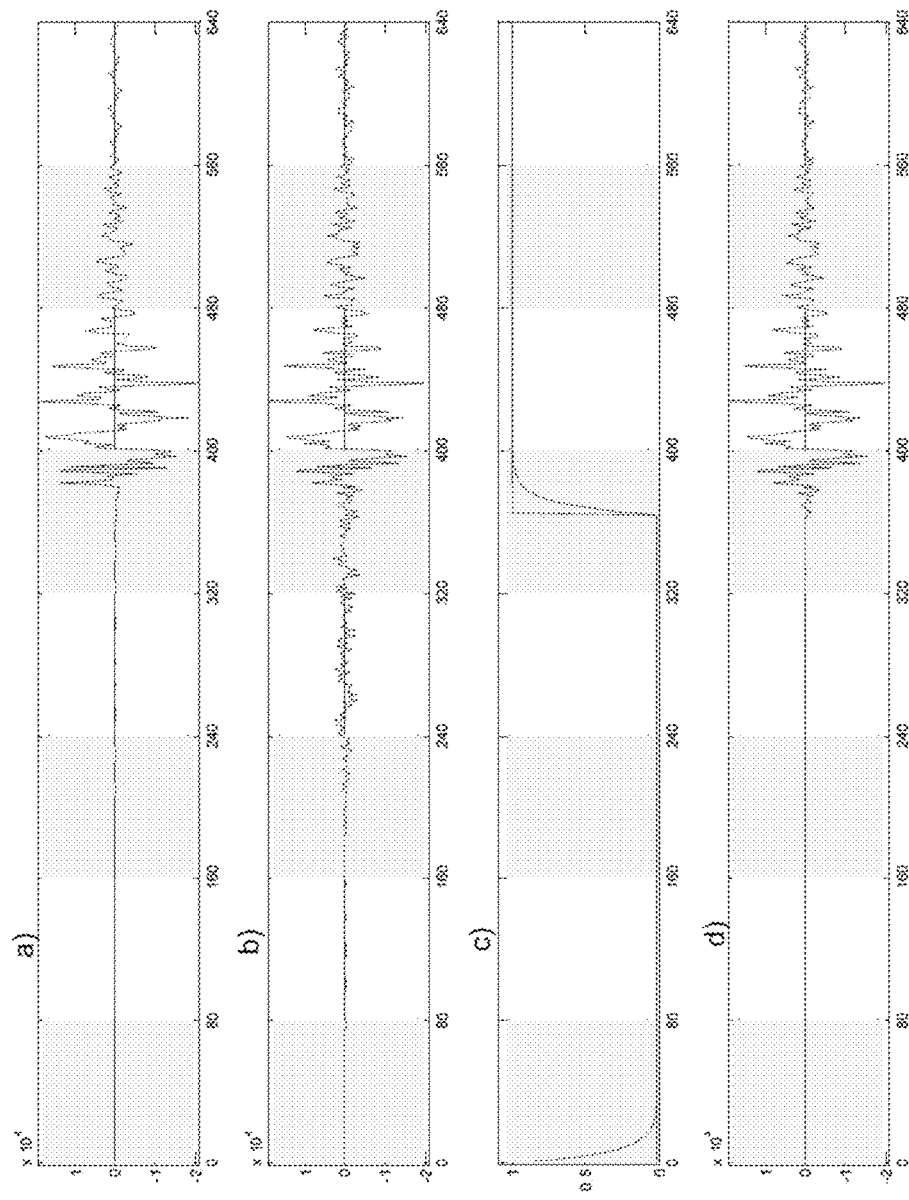
FIG. 3, previously described, illustrates another exemplary digital audio signal for which an attenuation method according to the prior art is performed.
Figure 4:
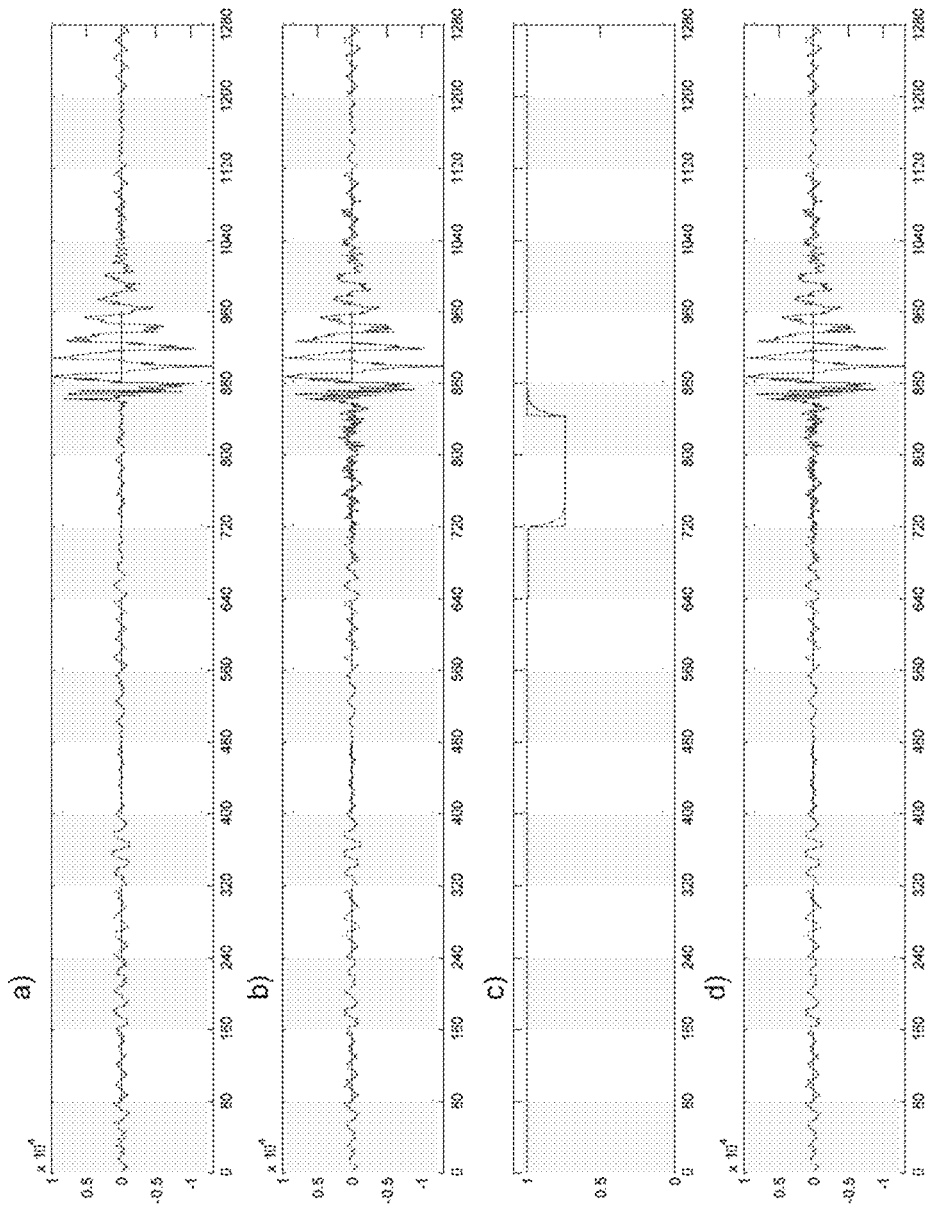
FIG. 4, described previously, illustrates yet another exemplary digital audio signal for which an attenuation method according to the prior art is performed.
Figure 5B:
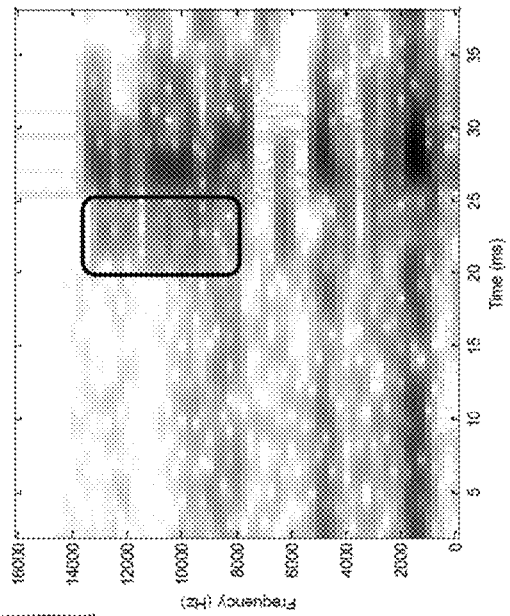
FIGS. 5a and 5b respectively illustrate the spectrogram of the original signal and the spectrogram of the signal with pre-echo attenuation according to the prior art (corresponding respectively to the parts a) and d) of FIG. 4)
Figure 5A:
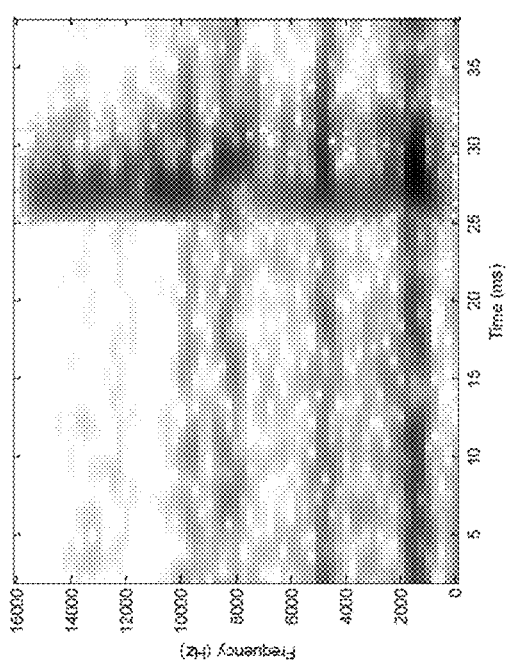

Indeed, FIG. 1 shows that the pre-echo influences the frame which precedes the frame where the onset is located, and it is desirable to detect an onset in the future frame which is partly contained in the MDCT memory.

It can be noted that the signal contained in the MDCT memory includes a temporal folding (which is compensated when the next frame is received). As explained below, the signal $x_{MDCT}(n)$ in the MDCT memory is used here mainly to estimate the energy per sub-block of the signal in the next (future) frame and it is considered that this estimation is sufficiently accurate for the needs of the detection and the attenuation of pre-echo when it is performed from the MDCT memory available on the next frame instead of the signal fully decoded on the future frame.

The current frame and the MDCT memory can be seen as concatenated signals forming a signal subdivided into (K+K') consecutive sub-blocks. In these conditions, the energy in the kth sub-block is defined as:

$$En(k) = \sum_{n=kL'}^{(k+1)L'-1} x_{rec}(n)^2, k = 0, \ldots, K-1$$

when the kth sub-block is located in the current frame and, as:

$$En(k) = \sum_{n=L_{cm}(k-K)}^{L_{cm}(k-K+1)-1} x_{MDCT}(n)^2, k = K, \ldots, K+K'-1$$

when the sub-block is in the MDCT memory (which represents the signal available for the future frame) and $L_{cm}(i)$ contains the boundaries of sub-blocks of the memory part:

$$L_{cm}(i) = \begin{cases} 0 & \text{if } i = 0 \\ \sum_{k=0}^{i-1} L_m(k) & \text{if } i > 0 \end{cases}$$

The average energy of the sub-blocks in the current frame is therefore obtained as:

$$\overline{En} = \frac{1}{K}\sum_{k=0}^{K-1} En(k)$$

The average energy of the sub-blocks in the second part of the current frame is also defined as (assuming that K is an even number):

$$\overline{En}' = \frac{2}{K}\sum_{k=K/2}^{K-1} En(k)$$

An onset associated with a pre-echo is detected if the ratio $$R(k) = \frac{\max_{n=0,K+K'-1}(En(n))}{En(k)}$$

exceeds a predefined threshold, in one of the sub-blocks considered. Other pre-echo detection criteria are possible without changing the nature of the invention.

Moreover, it is considered that the position of the onset is defined as $$pos = \min\left(L' \cdot \left(\arg\max_{k=0,K+K'-1}(En(k))\right), L\right)$$

where the limitation to L ensures that the MDCT memory is never modified. Other, more accurate, methods for estimating the position of the onset are also possible.

In variant embodiments with switching of the windows—in other words with adaptive MDCT windowing—other methods giving the position of the onset can be used with an accuracy ranging from the scale of a sub-block to a position plus or minus one sample.

In the example given above, the detection of the onsets which can generate a pre-echo is done on the decoded signal, common for all the sub-signals. In a variant embodiment, this detection can be done separately in sub-signals obtained following the step E603 described later. This case is illustrated by dotted line arrows "b".

The device 600 also comprises a determination module 602 implementing a step of determining (E602) a pre-echo zone (ZPE) preceding the detected onset position. Here, pre-echo zone is the name given to the zone covering the samples before the estimated position of the onset which are disturbed by the pre-echo generated by the onset and where the attenuation of this pre-echo is desirable. According to the invention, the pre-echo zone can be determined on the decoded signal (arrows a in FIG. 6). In a variant embodiment, it can be determined separately for each sub-signal.

In this variant embodiment, the pre-echo zone is determined independently for the sub-signals obtained by the step E603 described later, according to the embodiment described by the arrows b of FIG. 6. Thus, the pre-echo zone can be different for the different sub-signals.

Figure 10:
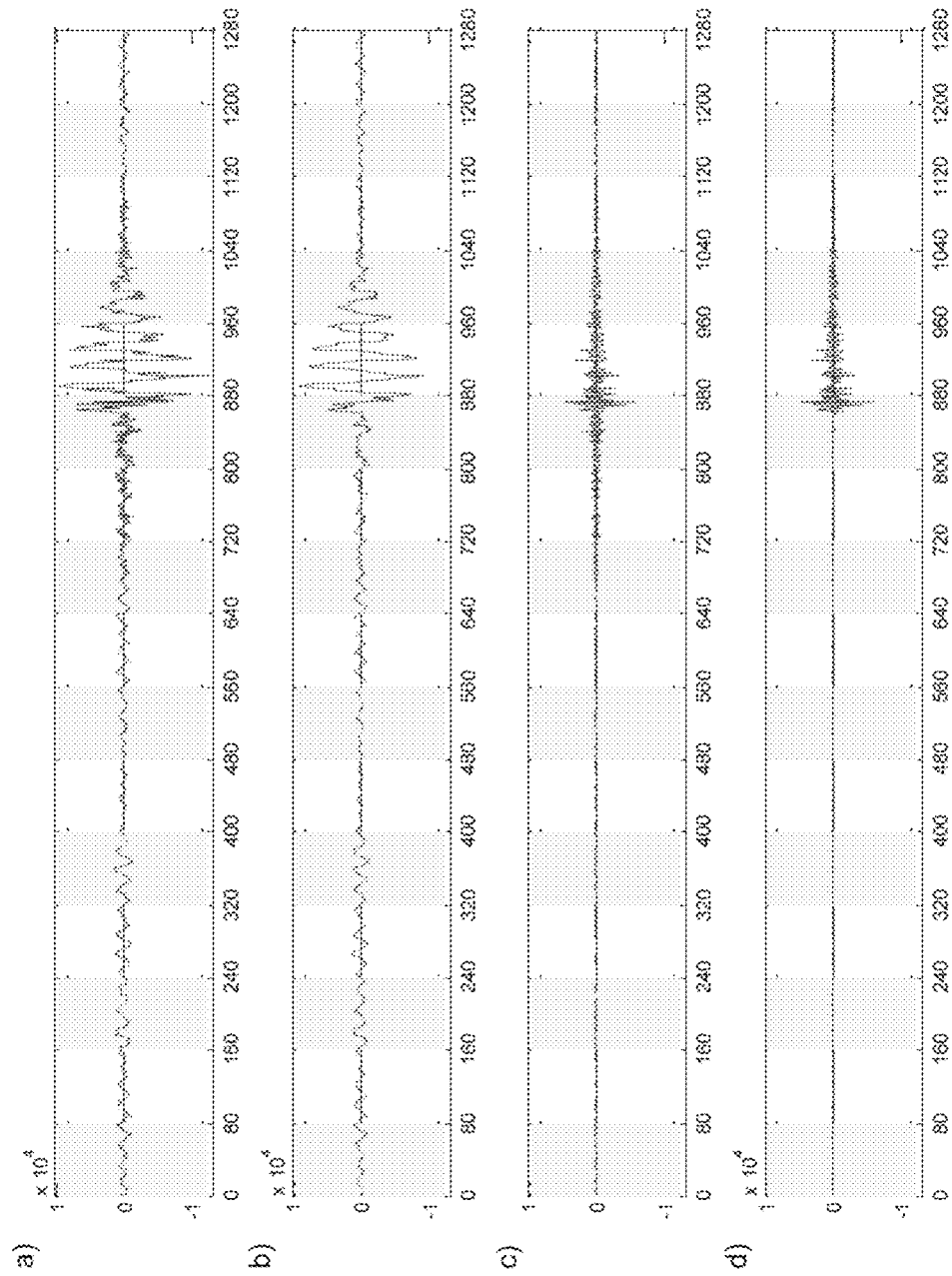
FIG. 10 illustrates an example of decomposition of a digital audio signal according to the invention for the implementation of the pre-echo attenuation processing.
Figure 11:
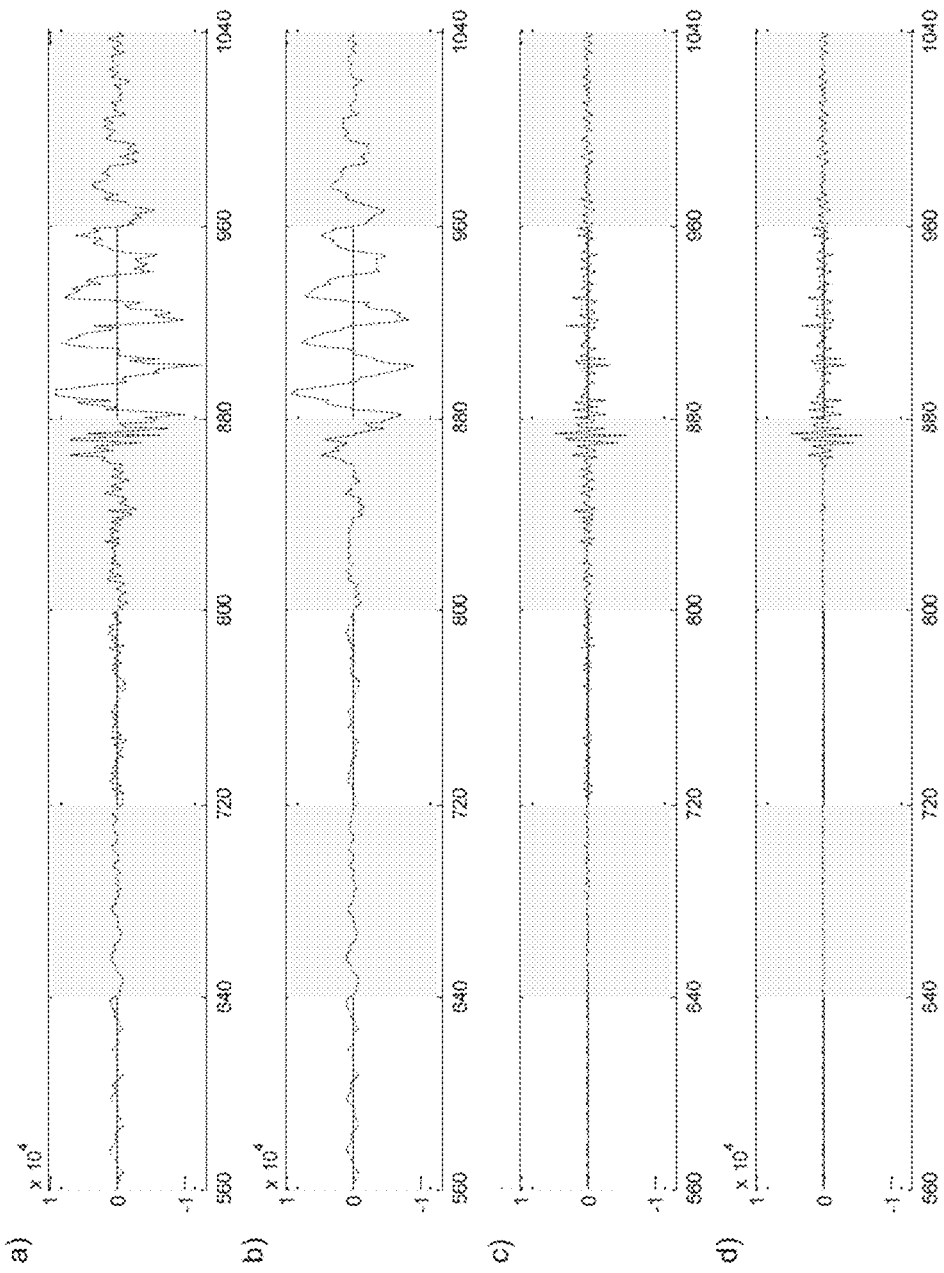
FIG. 11 reprises the signals of FIG. 10 by zooming on the samples close to the onset zone.

This difference is illustrated for example in FIGS. 10 and 11 which represent in a) an example of decoded signal (before pre-echo attenuation), in b), a first sub-signal with mostly low-frequency components (without pre-echo attenuation), in c), a second sub-signal with mostly high-frequency components (without pre-echo attenuation) and in d), the second sub-signal after pre-echo attenuation according to the invention. FIG. 11 takes up the same signals but with a zoom on the samples ranging from 560 to 1040.

It can be noted in these figures that the pre-echo is greater on the second sub-signal than on the first. The pre-echo zone of the two sub-signals illustrated here is therefore quite different. As a result of this, in FIG. 9, c) which illustrates the attenuation gains obtained for the two sub-signals, it can be seen that the attenuation gains (dotted line for the first sub-signal and solid line for the second) are such that, for the second sub-signal with high-frequency components, more samples are attenuated (samples 640 to 860) than for the first sub-signal with low-frequency components (samples 720 to 860).

In one embodiment of obtaining pre-echo zones, the energies En(k) are concatenated in chronological order, with, first, the temporal envelope of the decoded signal, then the envelope of the signal of the next frame estimated from the memory of the MDCT transform. As a function of this concatenated temporal envelope and of the average energies $\overline{En}$ and $\overline{En'}$ of the preceding frame, the presence of pre-echo is detected for example if the ratio R(k) exceeds a threshold, typically this threshold is 32.

The sub-blocks in which a pre-echo has been detected thus constitute a pre-echo zone, which generally covers the samples n=0, ..., pos−1, that is to say from the start of the current frame to the position of the onset (pos).

In variant embodiments, the pre-echo zone does not necessarily begin at the start of the frame, and can involve an estimation of the length of the pre-echo. If a window switching is used, the pre-echo zone will have to be defined to take into account the windows used. It can also be noted that the pre-echo zone may very well extend over the entire current frame if the onset has been detected in the future frame.

The device 600 comprises a signal decomposition module 603, suitable for performing a step E603 of decomposition of the decoded signal into at least two sub-signals according to a predetermined criterion.

This criterion can, for example, be a frequency criterion thus making it possible to obtain sub-signals with different frequency components as illustrated in FIGS. 10 and 11 described previously.

The criterion can, for example, be a criterion of periodicity of the signal thus giving sub-signals with components representative of the periodicity of the signal or, on the contrary, of its noise.

In a particular embodiment of the invention, the decoded signal $x_{rec}(n)$ is decomposed in the step E603 into two sub-signals as follows:

the first sub-signal $x_{rec,ss1}(n)$ is obtained by low-pass filtering by using an FIR filter (finite impulse response filter) with 3 coefficients and with zero transfer function phase $c(n)z^{-1}+(1-2c(n))+c(n)z$ with $c(n)$ being a value lying between 0 and 0.25, where $[c(n), 1-2c(n), c(n)]$ are the coefficients of the low-pass filter; this filter is implemented with the equation with differences:

$$x_{rec,ss1}(n)=c(n)x_{rec}(n-1)+(1-2c(n))x_{rec}(n)+c(n)x(n+1)$$

Figure 7A:
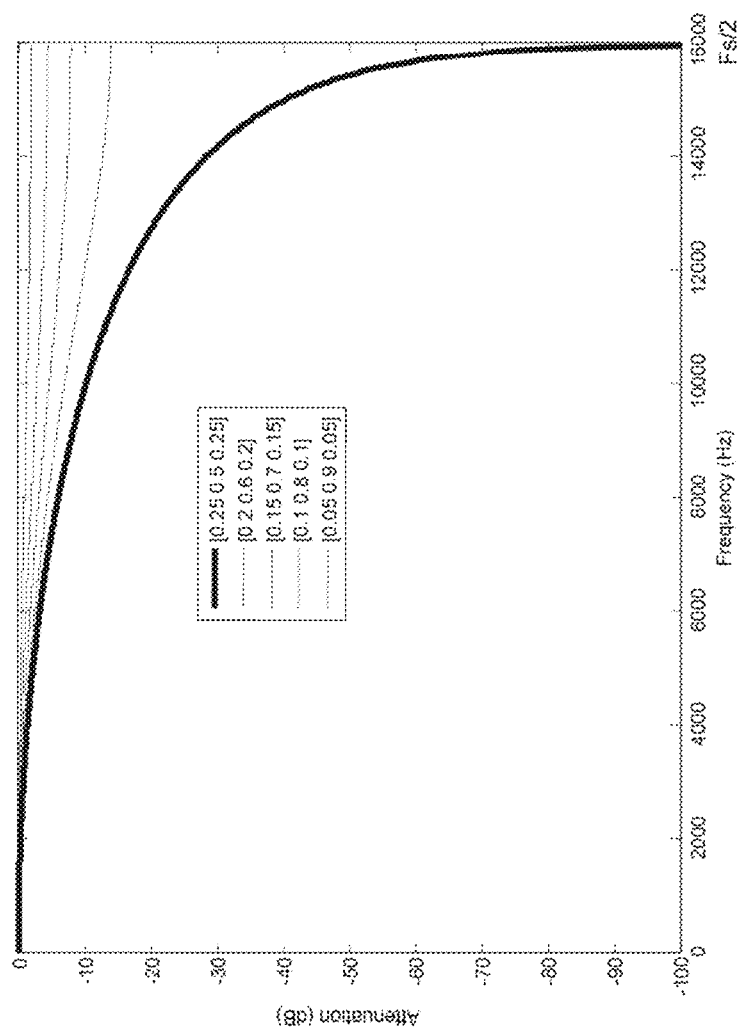
FIG. 7a illustrates the frequency response of a low-pass filter implemented according to one embodiment of the invention in the step of decomposition of the signal, for different filter parameter values.

In a particular embodiment, a constant value $c(n)=0.25$ is used. The frequency response of this filter is illustrated in FIG. 7a, as a function of the coefficients $[c(n), 1-2c(n), c(n)]$, for $c(n)=0.05, 0.1, 0.15, 0.2$ and $0.25$.

It can be noted that the sub-signal $x_{rec,ss1}(n)$ resulting from this filtering therefore contains more low-frequency components of the decoded signal.

Figure 7B:
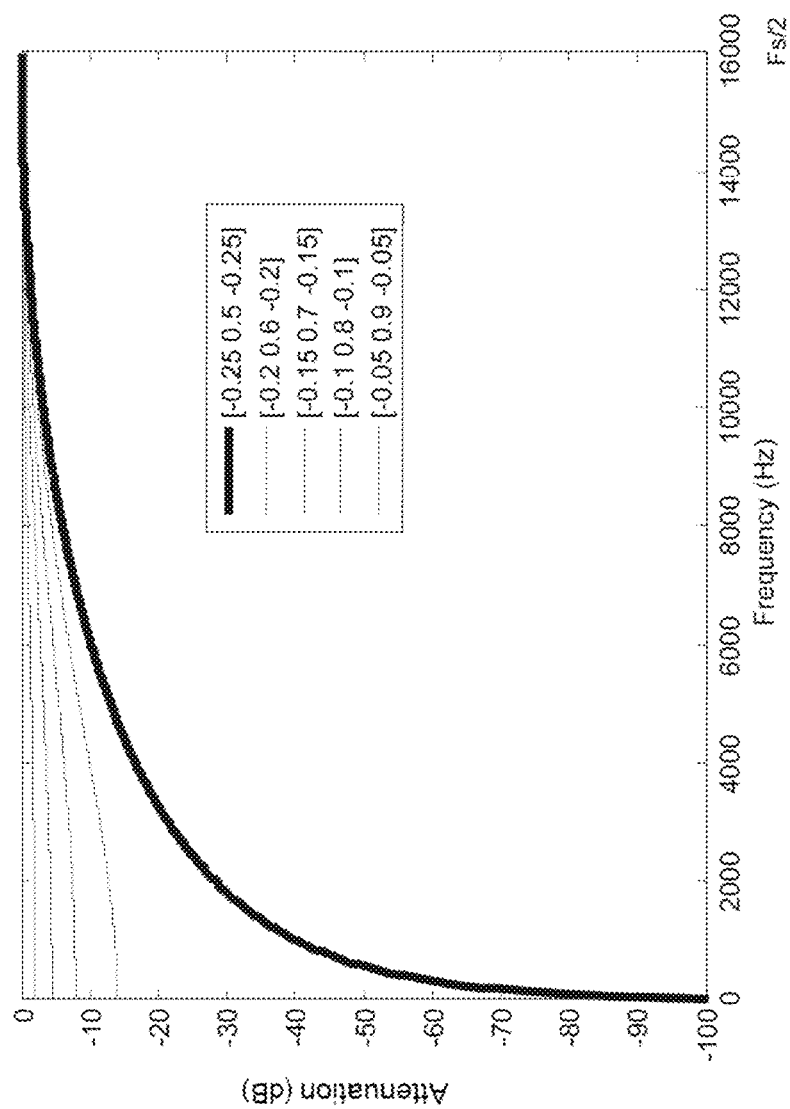
FIG. 7b illustrates the frequency response of a high-pass filter implemented according to an embodiment of the invention in the step of decomposition of the signal, for different filter parameter values.

The second sub-signal $x_{rec,ss2}(n)$ is obtained by complementary high-pass filtering by using an FIR filter with 3 coefficients and with zero transfer function phase $-c(n)z^{-1}+2c(n)-c(n)z$, where $[-c(n), 2c(n), -c(n)]$ are the coefficients of the high-pass filter; this filter is implemented with the equation with differences:
$x_{rec,ss2}(n)=-c(n)x_{rec}(n-1)+2c(n)x_{rec}(n)-c(n)x(n+1)$ The frequency response of this filter is illustrated in FIG. 7b, as a function of the coefficients $[-c(n), 2c(n), -c(n)]$, for $c(n)=0.05, 0.1, 0.15, 0.2$ and $0.25$. The sub-signal $x_{rec,ss2}(n)$ resulting from this filtering therefore contains more high-frequency components of the decoded signal.

The motivation for using these filters is their very low complexity of implementation (in terms of number of computations per sample), their zero phase and their low associated delay (1 sample)—it should be noted that these filters are in fact used without delay, because the future (look ahead) signal is reduced to one sample and it is predicted from the decoded signal, this prediction being described later. Their frequency responses correspond well to the characteristics of low-pass and high-pass filters and make it possible to decompose the signal into 2 sub-signals according to their frequency content. It should be noted that $x_{rec,ss1}(n)+x_{rec,ss2}(n)=x_{rec}(n)$.

It is therefore also possible to obtain $x_{rec,ss2}(n)$ by subtracting $x_{rec,ss1}(n)$ from $x_{rec}(n)$ which reduces the complexity of the computations: $x_{rec,ss2}(n)=x_{rec}(n)-x_{rec,ss1}(n)$.

In both cases, the combination of the attenuated sub-signals to obtain the attenuated signal is done by simple addition of the attenuated sub-signals in the step E606 described later.

So as not to use the future signal for these filterings, it is for example possible to complement the decoded signal with a 0 sample at the end of the block. Other values are possible to complement (predict) the future signal: for example, it would be possible to repeat the last sample (the last value of the block) or predict the future sample, for example by simple linear extrapolation. In the case of the decoded signal complemented by a 0 sample at the end of the block for n=L−1, the sub-signal $x_{rec,ss1}(n)$ is obtained by:

$$x_{rec,ss1}(L-1)=c(L-1)x_{rec}(L-2)+(1-2c(L-1))x_{rec}(L-1),$$

$x_{rec,ss2}(n)$ is still computed as $$x_{rec,ss2}(n)=x_{rec}(n)-x_{rec,ss1}(n).$$

It can be noted that the two sub-signals here remain at the same sampling frequency as the decoded signal. In variants of the embodiment, it will be possible to extend the order of the low-pass and high-pass filters, for example by changing to the order 4 (instead of 2), while keeping their zero phase characteristics.

A step E604 of computation of pre-echo attenuation factors is implemented in the computation module 604. This computation is done separately for the two sub-signals.

These attenuation factors are obtained per sample of the pre-echo zone determined as a function of the frame in which the onset was detected and of the preceding frame.

The factors $g_{pre,ss1}'(n)$ and $g_{pre,ss2}'(n)$ are then obtained, in which n is the index of the corresponding sample. These factors will, if necessary, be smoothed to obtain the factors $g_{pre,ss1}(n)$ and $g_{pre,ss2}(n)$ respectively. This smoothing is above all important for the sub-signals containing the low-frequency components (therefore for $g_{pre,ss1}'(n)$ in this example).

For reasons of simplicity, we detail here the example of the decomposition into two sub-signals of the signal decoded by FIR filtering with 3 coefficients, where these two sub-signals respectively contain the mostly low-frequency and high-frequency components of the decoded signal.

Thus, the attenuation factor can be chosen totally independently for the sub-signals and the attenuation level can be accurately set, based on the past and the future of each sub-signal.

An example of attenuation computation performance is described in the patent application FR 08 56248. The attenuation factors are computed per sub-block. In the method described here, they are, in addition, computed separately for each sub-signal. For the samples preceding the detected onset, the attenuation factors $g_{pre,ss1}'(n)$ and $g_{pre,ss2}'(n)$ are therefore computed. Next, these attenuation factors are, if necessary, smoothed to obtain the attenuation values per sample.

The computation of the attenuation factor of a sub-signal (for example $g_{pre,ss2}'(n)$) can be similar to that described in the patent application FR 08 56248 for the signal decoded as a function of the ratio R(k) (used also for the detection of the onset) between the energy of the sub-block of strongest energy and the energy of the kth sub-block of the decoded signal. $g_{pre,ss2}'(n)$ is initialized as:

$g_{pre,ss2}'(n)=g(k)=f(R(k)), n=kL', \ldots, (k+1)L'-1; k=0, \ldots, K-1$ in which $f$ is a decreasing function with values between 0 and 1. Other definitions of the factor g(k) are possible, for example as a function of En(k) and of En(k−1).

If the variation of the energy relative to the maximum energy is low, no attenuation is then necessary. The factor is then set at an attenuation value that inhibits the attenuation, that is to say 1. Otherwise, the attenuation factor lies between 0 and 1. This initialization can be common for all the sub-signals.

In a variant embodiment, the initialization can be different for the sub-signals.

In another variant embodiment, instead of using the same ratio R(k) for the detection of the onset and the processing in the domain of the decoded signal, it is possible to recompute the same type of ratio on the sub-signal concerned.

In yet another variant embodiment $f(R(k))$ can be constant for all the pre-echo zone, for example $f(R(k))=0.01$.

The attenuation values are then refined per sub-signal to be able to set the optimum attenuation level per sub-signal as a function of the characteristics of the decoded signal. For example, the attenuations can be limited as a function of the average energy of the sub-signal of the preceding frame because it is not desirable, after the pre-echo attenuation processing, for the energy of the signal to become lower than the average energy per sub-block of the signal preceding the processing zone (typically that of the preceding frame or that of the second half of the preceding frame).

This limitation can be done in a manner similar to that described in the patent application FR 08 56248. For example, for the second sub-signal $x_{rec,ss2}(n)$ the energy in the K sub-blocks of the current frame is first computed as:

$$En_{ss2}(k) = \sum_{n=kL'}^{(k+1)L'-1} x_{rec,ss2}(n)^2, k = 0, \ldots, K-1$$

Also known, from memory, are the average energy of the preceding frame $\overline{En_{ss2}}$ and that of the second half of the preceding frame $\overline{En_{ss2}}'$ which can be computed (in the preceding frame) as:

$$\overline{En_{ss2}} = \frac{1}{K}\sum_{k=0}^{K-1} En_{ss2}(k)$$

and $$\overline{En_{ss2}}' = \frac{2}{K}\sum_{k=K/2}^{K-1} En_{ss2}(k)$$

in which the sub-block indices from 0 to K correspond to the current frame.

For the sub-block k to be processed, the limit value of the factor $\lim_{g,ss2}(k)$ can be computed in order to obtain exactly the same energy as the average energy per sub-block of the segment preceding the sub-block to be processed. This value is of course limited to a maximum of one since it is the attenuation values that are of interest here. More specifically:

$$\lim_{g,ss2}(k) = \min\left(\sqrt{\frac{\max(\overline{En_{ss2}}, \overline{En_{ss2}}')}{En_{ss2}(k)}}, 1\right)$$

in which the average energy of the preceding segment is approximated by $\max(\overline{En_{ss2}}, \overline{En_{ss2}}')$.

The value $\lim_{g,ss2}(k)$ thus obtained serves as a lower limit in the final computation of the attenuation factor of the sub-block:

$g_{pre,ss2}'(n)=\max(g_{pre,ss2}'(n), \lim_{g,ss2}(k)),$
$n=kL', \ldots, (k+1)L'-1; k=0, \ldots, K-1$ In a first variant embodiment, the pre-echo zone where the attenuation extends from the start of the current frame to the start of the sub-block in which the onset has been detected—as far as the index pos where $$pos = \min\left(L' \cdot \left(\arg\max_{k=0, K+K'-1}(En(k))\right), L\right).$$

The attenuations associated with the samples of the sub-block of the onset are all set to 1 even if the onset is located toward the end of this sub-block.

In another variant embodiment, the start position of the onset pos is refined in the sub-block of the onset, for example by subdividing the sub-block into sub-sub-blocks and by observing the trend of the energy in these sub-sub-blocks. If it is assumed that the position of the start of the onset is detected in the sub-block k, k>0, and the start of the refined onset pos is located in this sub-block, the attenuation values for the samples of this sub-block which are located before the index pos can be initialized as a function of the attenuation value corresponding to the last sample of the preceding sub-block:

$g_{pre,ss2}'(n)=g_{pre,ss2}'(kL'-1), n=kL', \ldots, pos-1$

All the attenuations from the index pos are set to 1.

For the first sub-signal containing the low-frequency components of the decoded signal, the computation of the attenuation values on the basis of the sub-signal $x_{rec,ss1}(n)$ can be similar to the computation of the attenuation values on the basis of the decoded signal $x_{rec}(n)$. Thus, in a variant embodiment, in the interests of reducing computation complexity, the attenuation values can be determined on the basis of the decoded signal $x_{rec}(n)$. In the case where the detection of the onsets is made on the decoded signal it is therefore no longer necessary to recompute the energies of the sub-blocks because, for this signal, the energy values per sub-block are already computed to detect the onsets. Since for the vast majority of the signals the low frequencies have much more energy than the high frequencies, the energies per sub-block of the decoded signal $x_{rec}(n)$ and of the sub-signal $x_{rec,ss1}(n)$ are very close, this approximation gives a very satisfactory result. This can be observed in FIGS. 10 and 11 where the amplitude of the decoded signal in a) and of the sub-signal mostly comprising low-frequency components in b) are very close, contrary to that of the sub-signal mostly comprising high-frequency components in c) with much less energy. Thus, in this variant, for at least one sub-signal, the computation of the attenuation factor is performed by using at least one parameter from the step of detection of an onset position in the decoded signal, which further reduces the complexity.

The attenuation factors $g_{pre,ss1}(n)$ and $g_{pre,ss2}(n)$ determined per sub-block can then be smoothed by a smoothing function applied sample by sample to avoid abrupt variations of the attenuation factor at the boundaries of the blocks. This is particularly important for the sub-signals containing low-frequency components like the sub-signal $x_{rec,ss1}(n)$ but not necessary for the sub-signals containing only high-frequency components like the sub-signal $x_{rec,ss2}(n)$.

Figure 9:
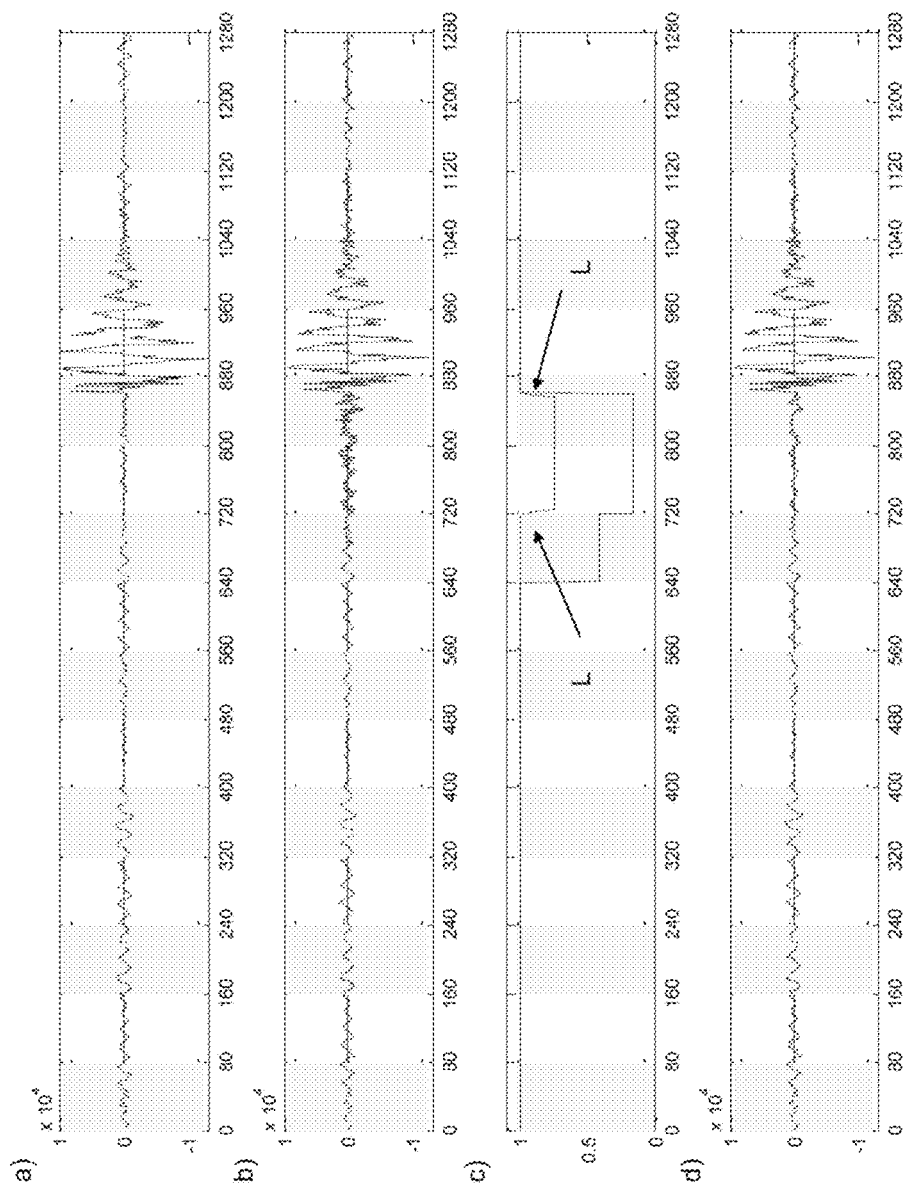
FIG. 9 illustrates an exemplary digital audio signal for which the pre-echo attenuation method according to the invention is implemented.

FIG. 9 illustrates an exemplary application of an attenuation gain with smoothing functions represented by the arrows L.

This figure illustrates, in a), an example of original signal, in b), the signal decoded without pre-echo attenuation, in c), the attenuation gains for the two sub-signals obtained according to the method of the invention in the decomposition step and, in d), the signal decoded with echo attenuation according to the invention (that is to say after combination of the two attenuated sub-signals).

It can be seen in this figure that the attenuation gain represented by broken lines and corresponding to the gain computed for the first sub-signal comprising low-frequency components, comprises smoothing functions as described above. The attenuation gain represented by a solid line and computed for the second sub-signal comprising high-frequency components does not include any smoothing gain.

The signal represented in d) shows clearly that the pre-echo has been attenuated effectively by the method according to the invention.

The smoothing function is for example defined preferably by the following equations:

$$g_{pre,ss1}(n) = \frac{1}{u}\sum_{i=0}^{u-1} g'_{pre,ss1}(n-i), n = 0, \ldots, L-1$$

with the convention that $g_{pre,ss1}'(n) n=-(u-1), \ldots, -1$ are the last u−1 attenuation factors obtained for the last samples of the sub-block preceding the sub-signal $x_{rec,ss1}(n)$. Typically u=5 but another value could be used. Depending on the smoothing used, the pre-echo zone (the number of the attenuated samples) can therefore be different for the two sub-signals processed separately, even if the detection of the onset is made in common on the basis of the decoded signal.

The smoothed attenuation factor does not go back up to 1 at the time of the onset, which implies a reduction of the amplitude of the onset. The perceptible impact of this reduction is very small but must nevertheless be avoided. To mitigate this problem, the attenuation factor value can be forced to 1 for the u−1 samples preceding the index pos where the start of the onset is located. This is equivalent to advancing the marker pos by u−1 samples for the sub-signal where the smoothing is applied. Thus, the smoothing function progressively increases the factor to have a value 1 at the time of the onset. The amplitude of the onset is then preserved.

Other smoothing functions are possible, for example:

$g_{pre,ss1}(n)=\alpha g_{pre,ss1}(n-1)+(1-\alpha)g_{pre,ss1}'(n)$ with, typically, $\alpha=0.85$.

If the Smoothing is not Applied:

$g_{pre,ss2}(n)=g_{pre,ss2}'(n)$

The module 605 of the device 600 of FIG. 6 implements the step E605 of attenuation of pre-echo in the pre-echo zone of each of the sub-signals by application to the sub-signals of the duly computed attenuation factors.

The pre-echo attenuation is therefore done independently in the sub-signals. Thus, in the sub-signals representing different frequency bands, the attenuation can be chosen as a function of the spectral distribution of the pre-echo.

Finally, a step E606 of the obtaining module 606 makes it possible to obtain the attenuated output signal (signal decoded after pre-echo attenuation) by combination (in this example by simple addition) of the attenuated sub-signals, according to the equation:

$$x_{rec,f}(n)=g_{pre,ss1}(n)x_{rec,ss1}(n)+g_{pre,ss2}(n)x_{rec,ss2}(n), n=0,\ldots,L-1$$

Unlike in a conventional sub-band decomposition, it can be noted here that the filterings used are not associated with operations of decimation of the sub-signals and the complexity and the delay ("look ahead" or future frame) are reduced to the minimum.

Other examples of decomposition of the decoded signal can very obviously be applied in the context of this invention.

For example, the decomposition of the decoded signal can be performed by using banks of critical decimation filters, for example of QMF (Quadrature Mirror Filter), PQMF (Pseudo Quadrature Mirror Filter) type, to obtain signals in sub-bands, these signals in sub-bands having a sampling frequency lower than that of the decoded signal.

Once the pre-echo attenuation is done in the sub-bands, the output signal is obtained by synthesis QMF filtering.

The decoded signal to be processed can be decomposed into several sub-signals, for example by using a QMF or PQMF filter with 4 sub-bands. This approach does however have the drawback of being more complex and of creating a delay of several samples.

Thus, more generally, the decomposition can make it possible to obtain more than two sub-signals.

Furthermore, the decomposition can be performed according to a criterion different from the frequency criterion.

A criterion of the signal periodicity type can for example be used. In this example of criterion, the decomposition of the decoded signal thus gives a first sub-signal with sinusoidal components and a second sub-signal with components of noise type when the signal model is of sine+noise type. Here again, this decomposition has the drawback of being more complex.

Whatever the decomposition criterion used, the decomposition into sub-signals, in the context of this invention, is applied specifically for the processing of the pre-echoes without it being naturally available to the decoder.

Thus, the computed attenuation factors are adapted specifically to the components of the sub-signals obtained according to the decomposition criterion. This makes it possible to render the pre-echo attenuation more accurate and better matched to the signal.

The use of a frequency criterion makes it possible to accurately control the quantity of attenuation applied in different frequency zones and thus more effectively attenuate the pre-echo.

This result is notably visible in FIGS. 9 to 11 described previously where it can be seen that the attenuation of pre-echo of the signal (notably of the second sub-signal) (represented in d)) is performed accurately.

Figure 12A:
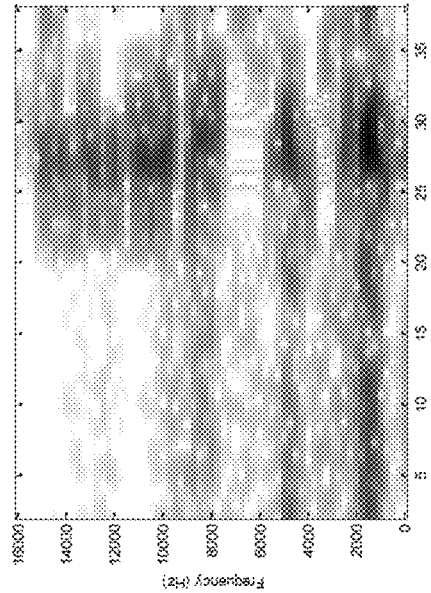
FIGS. 12a, 12b and 12c illustrate the respective spectrograms of an original digital audio signal, of the signal decoded without pre-echo attenuation processing and of the signal decoded with pre-echo attenuation processing according to the invention.
Figure 12B:
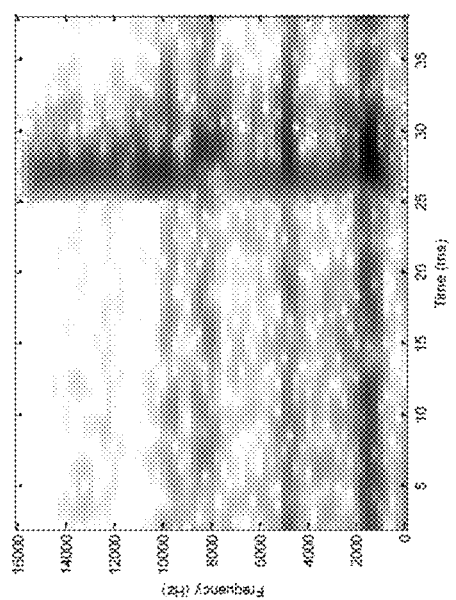
Figure 12C:
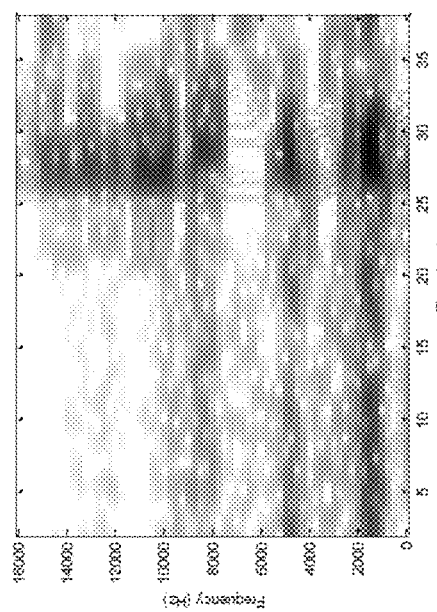

FIGS. 12a to 12c also show this result. In effect, FIG. 12a illustrates the spectrogram of an original signal where the onset can be clearly seen. FIG. 12b illustrates the signal decoded without pre-echo attenuation processing. The onset is then more visible. FIG. 12c illustrates the spectrogram of the signal decoded with the pre-echo attenuation processing according to the invention. It is again possible to precisely distinguish the attack whether it is in the high-frequency or low-frequency part.

Figure 13:
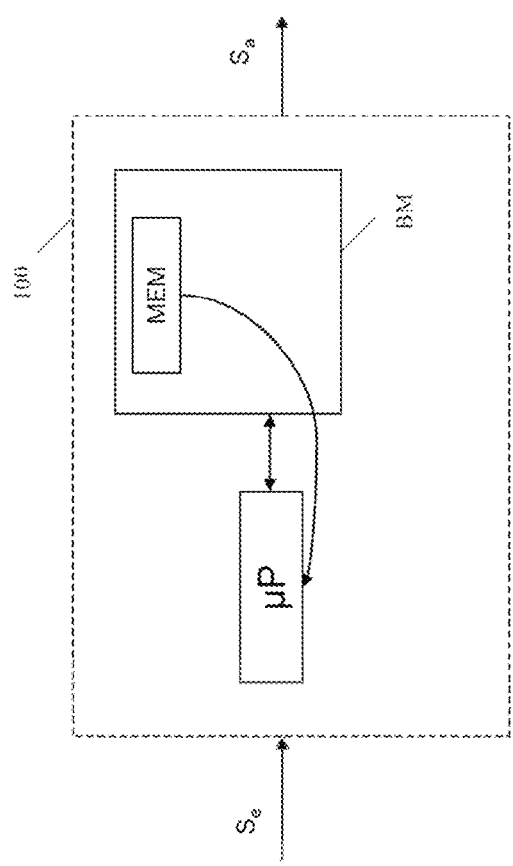
FIG. 13 illustrates a hardware example of an attenuation processing device according to the invention.

An exemplary embodiment of an attenuation processing device according to the invention is now described with reference to FIG. 13.

Physically, this device 100 within the meaning of the invention typically comprises, a processor µP cooperating with a memory block BM including a storage and/or working memory, and an abovementioned buffer memory MEM as means for storing all data necessary to the implementation of the attenuation processing method as described with reference to FIG. 6. This device receives as input successive frames of the digital signal Se and delivers the signal Sa reconstructed with attenuation of pre-echo in each of the sub-signals and reconstruction of the attenuated signal by combination of the attenuated sub-signals.

The memory block BM can comprise a computer program comprising code instructions for the implementation of the steps of the method according to the invention when these instructions are executed by a processor µP of the device, and notably a step of decomposition of the decoded signal into at least two sub-signals according to a predetermined decomposition criterion, of computation of attenuation factors per sub-signal and per sample of a previously determined pre-echo zone, of attenuation of pre-echo in the pre-echo zone of each of the sub-signals by application of the attenuation factors to the sub-signals and of obtaining of the attenuated signal by combination of the attenuated sub-signals.

FIG. 6 may illustrate the algorithm of such a computer program.

This attenuation device according to the invention can be independent or incorporated in a digital signal decoder. Such a decoder can be incorporated in digital audio signal storage or transmission equipment items such as communication gateways, communication terminals or servers of a communication network.

Although the present disclosure has been described with reference to one or more examples, workers skilled in the art will recognize that changes may be made in form and detail without departing from the scope of the disclosure and/or the appended claims.

The invention claimed is:

1. A method comprising:
   processing attenuation of pre-echo in a digital decoded audio signal by a processing device, wherein the processing comprises:
   receiving at an input of the processing device a decoded signal in a communication network from a decoder device that has decoded the digital audio signal according to a transform decoding into the decoded signal, without the processing device receiving auxiliary information regarding the digital audio signal for attenuation of the pre-echo;
   decomposition of the decoded signal into at least two sub-signals according to a predetermined decomposition frequency criterion, the decomposition being performed by a first low-pass filtering in the form of a finite impulse response filtering with zero transfer function phase:

$$c(n)z^{-1}+(1-2c(n))+c(n)z$$

with c(n) being a coefficient lying between 0 and 0.25, to obtain a first sub-signal, a second sub-signal being obtained by subtraction of the first sub-signal from the decoded signal;
   computation of respective attenuation factors per sub-signal and per sample of a previously determined pre-echo zone;
   attenuation of pre-echo in the pre-echo zone of each of the sub-signals by application of the respective attenuation factors to the sub-signals;
   producing an attenuated, processed digital audio signal by combining the attenuated sub-signals, in which the pre-echo attenuation has been performed; and
   outputting the attenuated, processed digital audio signal on an output of the processing device so that the processed digital audio signal can be played.

2. The method as claimed in claim 1, wherein the pre-echo zone is determined according to the following acts:
   detection of an onset position in the decoded signal, before the decomposition act;
   determination of a pre-echo zone preceding the onset position detected in the decoded signal before the decomposition acts or in the sub-signals after the decomposition act.

3. The method as claimed in claim 1, wherein the pre-echo zone is determined according to the following acts:
   detection of an onset position in each of the sub-signals obtained after the decomposition act;
   determination of a pre-echo zone preceding the onset position detected in each of the sub-signals.

4. The method as claimed in claim 2, wherein, for at least one sub-signal, the computation of the attenuation factor is performed by using at least one parameter from the act of detection of an onset position in the decoded signal.

5. The method as claimed in claim 1, comprising an act of smoothing the attenuation factor for at least one sub-signal.

6. The method as claimed in claim 1, wherein the attenuation factor is forced to 1 for a predetermined number of samples preceding the start of the onset.

7. A device for processing attenuation of pre-echo in a decoded digital audio signal, wherein the device comprises:
   an input for receiving a decoded signal in a communication network from a decoder device that has decoded the digital audio signal according to a transform decoding into the decoded signal, without receiving auxiliary information regarding the digital audio signal for attenuation of the pre-echo;
   a processor;
   a non-transitory computer-readable medium comprising instructions stored thereon which, when executed by the processor configure the device to:
   decompose the decoded signal into at least two sub-signals according to a predetermined decomposition frequency or periodicity criterion the decomposition being performed by a first low-pass filtering in the form of a finite impulse response filtering with zero transfer function phase:

$$c(n)z^{-1}+(1-2c(n))+c(n)z$$

with c(n) being a coefficient lying between 0 and 0.25, to obtain a first sub-signal, a second sub-signal being obtained by subtraction of the first sub-signal from the decoded signal;

compute respective attenuation factors per sub-signal and per sample of a previously determined pre-echo zone;

attenuate pre-echo in the pre-echo zone of each of the sub-signals by application of the respective attenuation factors to the sub-signals; and produce an attenuated, processed digital audio signal by addition of the attenuated sub-signals, in which the pre-echo attenuation has been performed; and an output for providing the processed digital audio signal so that the processed digital audio signal can be played.

8. A decoder device of a digital audio signal comprising the device for processing as claimed in claim 7.

9. A non-transitory computer-readable medium comprising a computer program stored thereon, which comprises code instructions for implementing a method for processing attenuation of pre-echo in a decoded digital audio signal, when these instructions are executed by a processor of a processing device, wherein the instructions comprise:

instructions that configure the processor to receive at an input of the processing device a decoded signal in a communication network from a decoder device that has decoded the digital audio signal according to a transform decoding into the decoded signal, without receiving auxiliary information regarding the digital audio signal for attenuation of the pre-echo;

instructions that configure the processor to decompose the decoded signal into at least two sub-signals according to a predetermined decomposition frequency or periodicity criterion the decomposition being performed by a first low-pass filtering in the form of a finite impulse response filtering with zero transfer function phase:

$$c(n)z^{-1}+(1-2c(n))+c(n)z$$

with c(n) being a coefficient lying between 0 and 0.25, to obtain a first sub-signal, a second sub-signal being obtained by subtraction of the first sub-signal from the decoded signal;

instructions that configure the processor to compute respective attenuation factors per sub-signal and per sample of a previously determined pre-echo zone;

instructions that configure the processor to attenuate pre-echo in the pre-echo zone of each of the sub-signals by application of the respective attenuation factors to the sub-signals;

instructions that configure the processor to produce and attenuated, processed digital audio signal by combining the attenuated sub-signals, in which the pre-echo attenuation has been performed; and instructions that configure the processor to output the attenuated, processed digital audio signal on an output of the processing device so that the processed digital audio signal can be played.

* * * * *